United States Patent
Meng et al.

(10) Patent No.: US 12,345,855 B2
(45) Date of Patent: Jul. 1, 2025

(54) OPTICAL IMAGING LENS ASSEMBLY

(71) Applicant: Zhejiang Sunny Optics Co., Ltd., Yuyao (CN)

(72) Inventors: Xiangyue Meng, Yuyao (CN); Liqi Yu, Yuyao (CN); Lili Miao, Yuyao (CN); Liefeng Zhao, Yuyao (CN); Fujian Dai, Yuyao (CN)

(73) Assignee: Zhejiang Sunny Optics Co., Ltd., Yuyao (CN)

( * ) Notice: Subject to any disclaimer, the term of this patent is extended or adjusted under 35 U.S.C. 154(b) by 725 days.

(21) Appl. No.: 17/646,543

(22) Filed: Dec. 30, 2021

(65) Prior Publication Data
US 2022/0252843 A1 Aug. 11, 2022

(30) Foreign Application Priority Data

Feb. 1, 2021 (CN) .......................... 202110133590.5

(51) Int. Cl.
G02B 9/62 (2006.01)
G02B 13/00 (2006.01)

(52) U.S. Cl.
CPC .......... G02B 13/0045 (2013.01); G02B 9/62 (2013.01)

(58) Field of Classification Search
CPC ...... G02B 13/0045; G02B 9/62; G02B 13/18; G02B 13/002; G02B 5/005; G02B 13/001; G02B 13/06
USPC ................ 359/756, 761, 740, 725, 713, 728
See application file for complete search history.

(56) References Cited

U.S. PATENT DOCUMENTS

| | | | | |
|---|---|---|---|---|
| 10,288,847 B1* | 5/2019 | Sato | .................... | G02B 9/62 |
| 2014/0247507 A1* | 9/2014 | Tsai | .................... | G02B 13/0045 |
| | | | | 359/713 |
| 2019/0121079 A1* | 4/2019 | Oinuma | ............ | G02B 13/0045 |
| 2019/0146192 A1* | 5/2019 | Kubota | .................... | G02B 9/62 |
| | | | | 359/713 |
| 2019/0179119 A1 | 6/2019 | Kubota et al. | | |

FOREIGN PATENT DOCUMENTS

CN 111221096 A 6/2020

OTHER PUBLICATIONS

Gross et al. "Handbook of Optical Systems vol. 3: Aberration Theory and Correction of Optical Systems" Weinheim Germany, WILEY-VCH Verlag Gmbh & Co. KGaA, pp. 377-379 (Year: 2007).*

* cited by examiner

Primary Examiner — Marin Pichler
Assistant Examiner — Mackenzi Waddell
(74) Attorney, Agent, or Firm — Sughrue Mion, PLLC

(57) ABSTRACT

An optical imaging lens assembly is provided, which includes, sequentially from an object side to an image side along an optical axis, a first lens having a refractive power with a convex object-side surface; a second lens having a refractive power with a convex object-side surface; a third lens having a positive refractive power; a fourth lens having a negative refractive power with a concave object-side surface; a fifth lens having a refractive power; and a sixth lens having a refractive power. A half of a maximal field-of-view Semi-FOV of the optical imaging lens assembly satisfies: Semi-FOV≥70°. A half of a diagonal length ImgH of an effective pixel area on the imaging plane of the optical imaging lens assembly satisfies: ImgH≥7.8 mm.

19 Claims, 8 Drawing Sheets

OPTICAL IMAGING LENS ASSEMBLY

CROSS-REFERENCE TO RELATED APPLICATION

This application claims benefit of priority to Chinese Patent Application No. 202110133590.5 filed on Feb. 1, 2021 before the China National Intellectual Property Administration, the entire disclosure of which is incorporated herein by reference in its entity.

TECHNICAL FIELD

The present disclosure relates to the field of an optical element, and more specifically, relates to an optical imaging lens assembly.

BACKGROUND

At present, with rapid development of the mobile phone market, the camera functions of the mobile phones are becoming more and more mature, and the differences between the mobile phones and the professional camera devices are becoming smaller and smaller. In order to meet people's needs of daily shooting, it is often necessary to arrange two or even more optical imaging lens assemblies on one mobile phone. By analyzing the currently most popular configurations of the optical imaging lens assemblies on the mobile phones, the groups of the lens are basically still combinations of large imaging planes, wide angles and long focal lengths. For the purpose of reducing the number of lens assemblies or enhancing the abilities of a single lens assembly to shoot pictures, it is desirable to design lens assemblies that can have characteristics of large imaging planes, wide angles, and at the same time, high imaging qualities.

SUMMARY

The present disclosure provides an optical imaging lens assembly, which includes, sequentially from an object side to an image side along an optical axis, a first lens having a refractive power with a convex object-side surface; a second lens having a refractive power with a convex object-side surface; a third lens having a positive refractive power; a fourth lens having a negative refractive power with a concave object-side surface; a fifth lens having a refractive power; and a sixth lens having a refractive power. A half of a maximal field-of-view Semi-FOV of the optical imaging lens assembly may satisfy: Semi-FOV≥70°. A half of a diagonal length ImgH of an effective pixel area on the imaging plane of the optical imaging lens assembly may satisfy: ImgH≥7.8 mm.

In some embodiments, an effective focal length f3 of the third lens and an effective focal length f5 of the fifth lens may satisfy: 0.5<f5/f3<2.6.

In some embodiments, an effective focal length f4 of the fourth lens and an effective focal length f of the optical imaging lens assembly may satisfy: −1.5<f4/f<−1.0.

In some embodiments, an effective focal length f1 of the first lens and an effective focal length f2 of the second lens may satisfy: −4.0<f2/f1<−2.0.

In some embodiments, a radius of curvature R3 of the object-side surface of the second lens and a radius of curvature R5 of an object-side surface of the third lens may satisfy: R3/R5>1.0.

In some embodiments, a radius of curvature R6 of an image-side surface of the third lens, a radius of curvature R7 of the object-side surface of the fourth lens and a radius of curvature R10 of an image-side surface of the fifth lens may satisfy: 1.0<(R6+R7)/R10<2.5.

In some embodiments, a radius of curvature R11 of an object-side surface of the sixth lens, a radius of curvature R12 of an image-side surface of the sixth lens and an effective focal length f of the optical imaging lens assembly may satisfy: 1.0<(R11+R12)/f<2.0.

In some embodiments, a radius of curvature R1 of the object-side surface of the first lens and a radius of curvature R2 of an image-side surface of the first lens may satisfy: 4.5<R1/R2<14.5.

In some embodiments, an axial distance BFL from an image-side surface of the sixth lens to the imaging plane and a spaced interval T12 between the first lens and the second lens along the optical axis may satisfy: 1.5<BFL/T12<3.5.

In some embodiments, an axial distance TTL from the object-side surface of the first lens to the imaging plane, an axial center thickness CT2 of the second lens and an axial center thickness CT3 of the third lens may satisfy: 3.0<TTL/(CT2+CT3)<4.0.

In some embodiments, a thickness ETP1 of the first lens at a half of an entrance pupil diameter in a direction parallel to the optical axis and a thickness ETP2 of the second lens at the half of the entrance pupil diameter in the direction parallel to the optical axis may satisfy: 2.5<ETP2/ETP1<5.0.

In some embodiments, a combined focal length f12 of the first lens and the second lens and a combined focal length f23 of the second lens and the third lens may satisfy: −7.0<f12/f23≤−2.0.

In some embodiments, at least one of the first lens to the sixth lens is an aspheric glass lens.

In some embodiments, a distance EIN from the object-side surface of the first lens to the image-side surface of the sixth lens at the half of the entrance pupil diameter in the direction parallel to the optical axis and a distance ETL from the object-side surface of the first lens to the imaging plane at the half of the entrance pupil diameter in the direction parallel to the optical axis may satisfy: 1.0<ETL/EIN<1.5.

In some embodiments, the optical imaging lens assembly may further include a stop, and an axial distance SD from the stop to the image-side surface of the sixth lens and the half of the diagonal length ImgH of the effective pixel area on the imaging plane may satisfy: 1.0<SD/ImgH<1.5.

In some embodiments, an axial distance TTL from the object-side surface of the first lens to the imaging plane and the axial distance BFL from the image-side surface of the sixth lens to the imaging plane may satisfy: 3.5<TTL/BFL<5.0.

The present disclosure provides an optical imaging lens assembly, which includes, sequentially from an object side to an image side along an optical axis, a first lens having a negative refractive power; a second lens having a positive refractive power; a third lens having a positive refractive power; a fourth lens having a negative refractive power; a fifth lens having a positive refractive power; and a sixth lens having a refractive power. A half of a maximal field-of-view Semi-FOV of the optical imaging lens assembly may satisfy: Semi-FOV≥0.70°. A half of a diagonal length ImgH of an effective pixel area on the imaging plane of the optical imaging lens assembly may satisfy: ImgH≥7.8 mm.

In some embodiments, an effective focal length 3 of the third lens and an effective focal length f5 of the fifth lens may satisfy: 0.5<f5/f3<2.6.

In some embodiments, an effective focal length f4 of the fourth lens and an effective focal length f of the optical imaging lens assembly may satisfy: $-1.5<f4/f<-1.0$.

In some embodiments, an effective focal length f1 of the first lens and an effective focal length f2 of the second lens may satisfy: $-4.0<f2/f1<-2.0$.

In some embodiments, a radius of curvature R3 of an object-side surface of the second lens and a radius of curvature R5 of an object-side surface of the third lens may satisfy: $R3/R5>1.0$.

In some embodiments, a radius of curvature R6 of an image-side surface of the third lens, a radius of curvature R7 of an object-side surface of the fourth lens and a radius of curvature R10 of an image-side surface of the fifth lens may satisfy: $1.0<(R6+R7)/R10<2.5$.

In some embodiments, a radius of curvature R11 of an object-side surface of the sixth lens, a radius of curvature R12 of an image-side surface of the sixth lens and an effective focal length f of the optical imaging lens assembly may satisfy: $1.0<(R11+R12)/f<2.0$.

In some embodiments, a radius of curvature R1 of an object-side surface of the first lens and a radius of curvature R2 of an image-side surface of the first lens may satisfy: $4.5<R1/R2<14.5$.

In some embodiments, an axial distance BFL from an image-side surface of the sixth lens to the imaging plane and a spaced interval T12 between the first lens and the second lens along the optical axis may satisfy: $1.5<BFL/T12<3.5$.

In some embodiments, an axial distance TTL from an object-side surface of the first lens to the imaging plane, an axial center thickness CT2 of the second lens and an axial center thickness CT3 of the third lens may satisfy: $3.0<TT/(CT2+CT3)<4.0$.

In some embodiments, a thickness ETP1 of the first lens at a half of an entrance pupil diameter in a direction parallel to the optical axis and a thickness ETP2 of the second lens at the half of the entrance pupil diameter in the direction parallel to the optical axis may satisfy: $2.5<ETP2/ETP1<5.0$.

In some embodiments, a combined focal length f12 of the first lens and the second lens and a combined focal length f23 of the second lens and the third lens may satisfy: $-7.0<f12/f23<-2.0$.

In some embodiments, at least one of the first lens to the sixth lens is an aspheric glass lens.

In some embodiments, a distance EIN from the object-side surface of the first lens to the image-side surface of the sixth lens at the half of the entrance pupil diameter in the direction parallel to the optical axis and a distance ETL from the object-side surface of the first lens to the imaging plane at the half of the entrance pupil diameter in the direction parallel to the optical axis may satisfy: $1.0<ETL/EIN<1.5$.

In some embodiments, the optical imaging lens assembly may further include a stop, and an axial distance SD from the stop to the image-side surface of the sixth lens and the half of the diagonal length ImgH of the effective pixel area on the imaging plane may satisfy: $1.0<SD/ImgH<1.5$.

In some embodiments, an axial distance TTL from the object-side surface of the first lens to the imaging plane and the axial distance BFL from the image-side surface of the sixth lens to the imaging plane may satisfy: $3.5<TTL/BFL<5.0$.

The present disclosure adopts a six-piece lens assembly structure. By reasonably distributing the refractive powers and surface shapes, the optical imaging lens assembly can have the characteristics of a wide angle and a larger imaging plane, which improves the optical performances of the optical imaging lens assembly.

BRIEF DESCRIPTION OF THE DRAWINGS

Other features, objects, and advantages of the present disclosure will become more apparent from the following detailed description of non-limiting embodiments, taken in conjunction with the accompanying drawings. In the drawings.

DETAILED DESCRIPTION OF EMBODIMENTS

Figure 1:
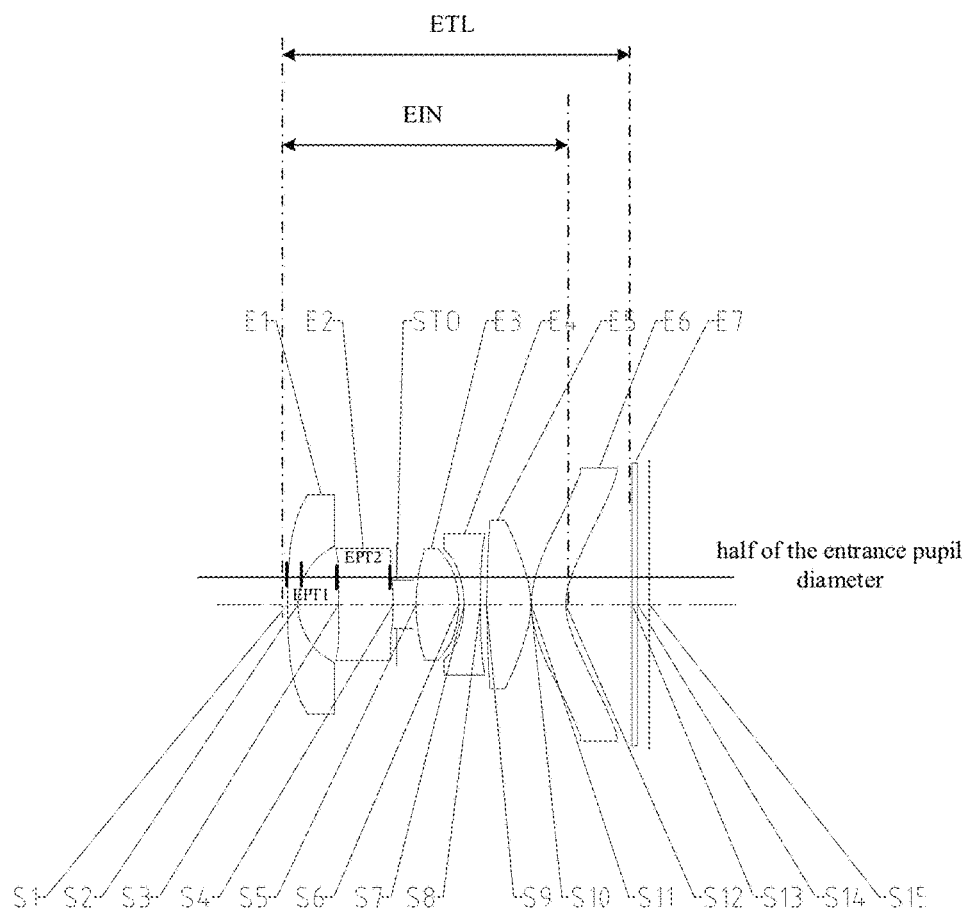
FIG. 1 is a schematic structural diagram showing an optical imaging lens assembly according to Example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, without departing from the teachings of the present disclosure, a first lens discussed below may also be referred to as a second lens or a third lens.

In the accompanying drawings, the thickness, size and shape of the lens have been somewhat exaggerated for the convenience of explanation. In particular, shapes of spherical surfaces or aspherical surfaces shown in the accompanying drawings are shown by way of example. That is, shapes of the spherical surfaces or the aspherical surfaces are not limited to the shapes of the spherical surfaces or the aspherical surfaces shown in the accompanying drawings. The accompanying drawings are merely illustrative and not strictly drawn to scale.

Herein, the paraxial area refers to an area near the optical axis. If a surface of a lens is a convex surface and the position of the convex surface is not defined, it indicates that the surface of the lens is convex at least in the paraxial region. If a surface of a lens is a concave surface and the position of the concave surface is not defined, it indicates that the surface of the lens is concave at least in the paraxial region. Herein, in each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging lens assembly according to an exemplary embodiment of the present disclosure may include, for example, six lenses having refractive powers, which are a first lens, a second lens, a third lens, a fourth lens, a fifth lens and a sixth lens respectively. The six lenses are sequentially arranged from an object side to an image side along an optical axis of the optical imaging lens assembly. Among the first lens to the sixth lens, there may be a spaced interval between any two adjacent lenses.

In an exemplary embodiment, the first lens has a positive or negative refractive power, the second lens has a positive or negative refractive power, and an object-side surface thereof may be a convex surface; the third lens may have a positive refractive power; the fourth lens may have a negative refractive power, and an object-side surface thereof may be a concave surface; the fifth lens has a positive or negative refractive power; and the sixth lens has a positive or negative refractive power. By reasonably distributing the refractive power and surface type of each lens, it is conducive for the optical imaging lens assembly to balance and correct various aberrations to obtain a lens assembly with a high imaging quality.

In an exemplary embodiment, the optical imaging lens assembly of the present disclosure may satisfy: Semi-FOV≥70°, where Semi-FOV is a half of a maximal field-of-view of the optical imaging lens assembly. Satisfying Semi-FOV≥70° may be conducive for the optical imaging lens assembly to satisfy a requirement of a wide angle. More specifically, Semi-FOV may satisfy: 80°≥Semi-FOV≥77°.

In an exemplary embodiment, the optical imaging lens assembly of the present disclosure may satisfy: ImgH≥7.8 mm, where ImgH is a half of a diagonal length of an effective pixel area on the imaging plane of the optical imaging lens assembly. When ImgH≥7.8 mm is satisfied, the optical imaging lens assembly may have a large imaging plane. More specifically, ImgH may satisfy: 8.2 mm≥ImgH≥7.8 mm.

In an exemplary embodiment, the optical imaging lens assembly of the present disclosure may satisfy: 0.5<f5/f3<2.6, where f3 is an effective focal length of the third lens and f5 is an effective focal length of the fifth lens. By controlling the ratio of f5 to f3 within this range, it may be conducive to reasonably distributing the effective focal lengths of the third lens and the fifth lens, and also conducive to correcting vertical chromatic aberrations of the optical imaging lens assembly, thereby improving the performances of the optical imaging lens assembly. More specifically, f5 and f3 may satisfy: 0.9<f5/f3<2.6.

In an exemplary embodiment, the optical imaging lens assembly of the present disclosure may satisfy: −1.5<f4/f<−1.0, where f4 is an effective focal length of the fourth lens and f is an effective focal length of the optical imaging lens assembly. By controlling the ratio of f4 to f within this range, it may be conducive to correcting axial chromatic aberrations of the optical imaging lens assembly. More specifically, f4 and f may satisfy: −1.5<f4/f<−1.2.

In an exemplary embodiment, the optical imaging lens assembly of the present disclosure may satisfy: −4.0<f2/f1<−2.0, where f1 is an effective focal length of the first lens and f2 is an effective focal length of the second lens. By controlling the ratio of f2 to f1 within this range, it may be conducive to reasonably distributing the effective focal lengths of the first lens and the second lens, and also conducive to correcting vertical chromatic aberrations of the optical imaging lens assembly. More specifically, f2 and f1 may satisfy: −3.6<f2/f1<−2.0.

In an exemplary embodiment, the optical imaging lens assembly of the present disclosure may satisfy: R3/R5>1.0, where R3 is a radius of curvature of an object-side surface of the second lens and R5 is a radius of curvature of an object-side surface of the third lens. By controlling the ratio of R3 to R5 within this range, it may be conducive to reasonably limiting the relative shapes of the second lens and the third lens, so that the optical imaging lens assembly can better correct spherical aberrations. In addition, it is also conducive for the optical imaging lens assembly to better match the chief ray angle of a chip, thereby improving the imaging quality of the optical imaging lens assembly. More specifically, R3 and R5 may satisfy: 7.5>R3/R5>1.2.

In an exemplary embodiment, the optical imaging lens assembly of the present disclosure may satisfy: 1.0<(R6+R7)/R10<2.5, where R6 is a radius of curvature of an image-side surface of the third lens, R7 is a radius of curvature of an object-side surface of the fourth lens and R10 is a radius of curvature of an image-side surface of the fifth lens. By controlling the ratio of the sum of R6 and R7 to R10 within this range, it may be conducive to controlling the coma contribution rates of the third lens, the fourth lens and the fifth lens within a reasonable range, thereby compensating the coma generated by each lens well to obtain a good imaging quality. More specifically, R6, R7 and R10 may satisfy: $1.2<(R6+R7)/R10<2.5$.

In an exemplary embodiment, the optical imaging lens assembly of the present disclosure may satisfy: $1.0<(R11+R12)/f<2.0$, where R11 is a radius of curvature of an object-side surface of the sixth lens, R12 is a radius of curvature of an image-side surface of the sixth lens and f is an effective focal length of the optical imaging lens assembly. By controlling the ratio of the sum of R11 and R12 to f within this range, it may be conducive to balancing the axial chromatic aberrations of the optical imaging lens assembly, and correcting the curvature of field. More specifically, R11, R12 and f may satisfy $1.3<(R11+R12)/f<1.9$.

In an exemplary embodiment, the optical imaging lens assembly of the present disclosure may satisfy: $4.5<R1/R2<14.5$, where R1 is a radius of curvature of the object-side surface of the first lens and R2 is a radius of curvature of an image-side surface of the first lens. By controlling the ratio of the radius of curvature of the object-side surface of the first lens to the radius of curvature of the image-side surface of the first lens within this range, it may be conducive to realizing the characteristics of a large field-of-view, a large aperture, and a high resolution of the optical imaging lens assembly. In addition, it is also conducive to reducing the sensitivity of the first lens and ensuring the first lens has a good processing technology characteristic. More specifically, R1 and R2 may satisfy: $4.7<R1/R2<14.4$.

In an exemplary embodiment, the optical imaging lens assembly of the present disclosure may satisfy: $1.5<BFL/T12<3.5$, where BFL is an axial distance from an image-side surface of the sixth lens to the imaging plane and T12 is a spaced interval between the first lens and the second lens along the optical axis. By controlling the ratio of BFL to T12 within this range, it is not only conducive to correcting the astigmatisms of the optical imaging lens assembly in the tangential and sagittal directions, but also conducive for the optical imaging lens assembly to meet the requirements of production and processing. More specifically, BFL and T12 may satisfy: $1.9<BFL/T12<3.2$.

In an exemplary embodiment, the optical imaging lens assembly of the present disclosure may satisfy: $3.0<TTL/(CT2+CT3)<4.0$, where TTL is an axial distance from the object-side surface of the first lens to the imaging plane, CT2 is an axial center thickness of the second lens and CT3 is an axial center thickness of the third lens. By controlling the ratio of TTL to the sum of CT2 and CT3 within this range, it is not only conducive to compensating the curvature of field of the off-axis field, but also conducive to ensuring the miniaturization of the optical imaging lens assembly. More specifically, TTL, CT2 and CT3 may satisfy: $3.3<TTL/(CT2+CT3)<3.8$.

In an exemplary embodiment, the optical imaging lens assembly of the present disclosure may satisfy: $1.0<SD/ImgH<1.5$, where SD is an axial distance from the stop to an image-side surface of the sixth lens and ImgH is a half of a diagonal length of an effective pixel area on an imaging plane. By controlling the ratio of SD to ImgH within this range, it is conducive to balancing and correcting the aberrations (for example, comas, astigmatisms, distortions, and axial chromatic aberrations, etc.) of the optical imaging lens assembly, which are related to a stop, thereby realizing high-definition imaging. More specifically, SD and ImgH may satisfy: $1.0<SD/ImgH<1.4$.

In an exemplary embodiment, the optical imaging lens assembly of the present disclosure may satisfy: $1.0<ETL/EIN<1.5$, where EIN is a distance from an object-side surface of the first lens to an image-side surface of the sixth lens at a half of an entrance pupil diameter in a direction parallel to the optical axis and ETL is a distance from the object-side surface of the first lens to the imaging plane at the half of the entrance pupil diameter in the direction parallel to the optical axis. By controlling the ratio of ETL to EIN within this range, it is not only conducive to ensuring that the optical imaging lens assembly has a certain degree of design freedom to fully optimize the design, but also conducive to controlling the optical paths of the lights in the middle field, thereby controlling the wavefront aberrations of the optical imaging lens assembly. More specifically, ETL and EIN may satisfy: $1.2<ETL/EIN<1.4$.

In an exemplary embodiment, the optical imaging lens assembly of the present disclosure may satisfy: $3.5<TTL/BFL<5.0$, where TTL is an axial distance from an object-side surface of the first lens to the imaging plane and BFL is an axial distance from an image-side surface of the sixth lens to the imaging plane. By controlling the ratio of TTL to BFL within this range, it is not only conducive to ensuring that the optical imaging lens assembly has a compact structure to meet the requirements of production and processing, but also conducive to ensuring that the optical imaging lens assembly has a sufficient back focal length. More specifically, TTL and BFL may satisfy: $3.6<TTL/BFL<4.7$.

In an exemplary embodiment, the optical imaging lens assembly of the present disclosure may satisfy: $2.5<ETP2/ETP1<5.0$, where ETP1 is a thickness of the first lens at a half of an entrance pupil diameter in a direction parallel to the optical axis and ETP2 is a thickness of the second lens at the half of the entrance pupil diameter in the direction parallel to the optical axis. By controlling the ratio of ETP2 to ETP1 within this range, it is not only conducive to ensuring the miniaturization of the head of the optical imaging lens assembly, but also conducive to ensuring the processability of the first lens and the second lens. More specifically, ETP2 and ETP1 may satisfy: $2.9<ETP2/ETP1<4.9$.

In an exemplary embodiment, the optical imaging lens assembly of the present disclosure may satisfy: $-7.0<f12/f23<-2.0$, where f12 is a combined focal length of the first lens and the second lens and f23 is a combined focal length of the second lens and the third lens. By controlling the ratio of f12 to f23 within this range, the optical power of each lens may be reasonably controlled, which is conducive to correcting the vertical and axial chromatic aberrations of the optical imaging lens assembly, and improving the optical performances of the optical imaging lens assembly. More specifically, f12 and 23 may satisfy: $-6.8<f12/f23<-2.0$.

In an exemplary embodiment, the optical imaging lens assembly may further include at least one stop, which may be disposed at an appropriate position as needed, for example, may be disposed between the second lens and the third lens. Alternatively, the optical imaging lens assembly may further include an optical filter for correcting the color deviation and/or a protective glass for protecting the photosensitive element on the imaging plane.

The optical imaging lens assembly according to the above embodiments of the present disclosure may adopt multiple lenses, for example, the above six lenses. By reasonably distributing the refractive power, surface type, center thickness of each lens and the axial distances between the lenses, the optical imaging lens assembly can have characteristics such as a large field-of-view and a large imaging plane, and at the same time, the axial and vertical chromatic aberrations of the optical imaging lens assembly can be effectively compensated to improve the imaging quality of the optical imaging lens assembly.

In the embodiments of the present disclosure, at least one of the lenses is an aspherical lens, that is, at least one of the surfaces from the object-side surface of the first lens to the image-side surface of the sixth lens is an aspheric surface. An Aspheric lens is characterized by a continuous change in curvature from the center of the lens to the periphery of the lens. Unlike a spherical lens, which has a constant curvature from the center of the lens to the periphery of the lens, an aspheric lens has better characteristics about radius of curvature and has the advantages of improving distortion and astigmatic aberration. With the aspheric lens, aberrations occurring during imaging can be eliminated as much as possible, thereby improving the imaging quality. Alternatively, at least one of the object-side surfaces and the image-side surfaces of the first lens, the second lens, the third lens, the fourth lens, the fifth lens and the sixth lens is aspheric surface. Alternatively, all of the object-side surfaces and the image-side surfaces of the first lens, the second lens, the third lens, the fourth lens, the fifth lens and the sixth lens are aspheric surfaces. In some embodiments, at least one of the first lens to the sixth lens is an aspheric glass lens.

However, it will be understood by those skilled in the art that the number of lenses constituting the optical lens assembly may be varied to achieve the various results and advantages described herein without departing from the technical solutions claimed by the present disclosure. For example, although some embodiments are described by taking six lenses as an example, the optical lens assembly is not limited to include six lenses. The optical lens assembly may alternatively include other numbers of lenses as needed.

Some specific examples of an optical imaging lens assembly applicable to the above embodiments will be further described below with reference to the accompanying drawings.

Example 1

An optical imaging lens assembly according to Example 1 of the present disclosure is described below with reference to FIGS. 1 to 2D. FIG. 1 shows a schematic structural diagram of the optical imaging lens assembly according to Example 1 of the present disclosure.

As shown in FIG. 1, the optical imaging lens assembly includes a first lens E1, a second lens E2, a stop STO, a third lens E3, a fourth lens E4, a fifth lens E5, a sixth lens E6, and an optical filter E7, which are sequentially arranged along an optical axis from an object side to an image side of the optical imaging lens assembly.

The first lens E1 has a negative refractive power, and an object-side surface S1 thereof is a convex surface and an image-side surface S2 thereof is a concave surface. The second lens E2 has a positive refractive power, and an object-side surface S3 thereof is a convex surface and an image-side surface S4 thereof is a convex surface. The third lens E3 has a positive refractive power, and an object-side surface S5 thereof is a convex surface and an image-side surface S6 thereof is a convex surface. The fourth lens E4 has a negative refractive power, and an object-side surface S7 thereof is a concave surface and an image-side surface S8 thereof is a concave surface. The fifth lens E5 has a positive refractive power, and an object-side surface S9 thereof is a convex surface and an image-side surface S10 thereof is a convex surface. The sixth lens E6 has a negative refractive power, and an object-side surface S11 thereof is a convex surface and an image-side surface S12 thereof is a concave surface. The optical filter E7 has an object-side surface S13 and an image-side surface S14. The optical imaging lens assembly has an imaging plane S15. Light from an object sequentially passes through the respective surfaces S1 to S14 and is finally imaged on the imaging plane S15.

Table 1 shows basic parameters of the optical imaging lens assembly of example 1, where the units for the radius of curvature and the thickness/distance are millimeter (mm).

TABLE 1

| Surface number | Surface type | Radius of curvature | Thickness/ Distance | Material Refractive index | Abbe number | Conic coefficient |
|---|---|---|---|---|---|---|
| OBJ | Spherical | Infinite | Infinite | | | |
| S1 | Aspheric | 41.4988 | 0.5962 | 1.55 | 56.1 | −30.0089 |
| S2 | Aspheric | 3.3874 | 2.2863 | | | −0.2967 |
| S3 | Aspheric | 43.1739 | 3.0909 | 1.65 | 23.5 | −99.0000 |
| S4 | Aspheric | −11.2.446 | 0.1839 | | | 1.1190 |
| STO | Spherical | Infinite | 1.1015 | | | |
| S5 | Aspheric | 10.4721 | 2.4214 | 1.59 | 61.2 | 4.8950 |
| S6 | Aspheric | −5.2085 | 0.2957 | | | −0.6239 |
| S7 | Aspheric | −5.2161 | 0.9142 | 1.67 | 20.4 | 1.2500 |
| S8 | Aspheric | 78.5551 | 0.3438 | | | 66.7382 |
| S9 | Aspheric | 37.5359 | 2.5000 | 1.55 | 56.1 | −14.5412 |
| S10 | Aspheric | −5.1158 | 0.0300 | | | −2.6041 |
| S11 | Aspheric | 4.8443 | 1.9300 | 1.67 | 20.4 | −5.4404 |
| S12 | Aspheric | 3.4249 | 3.7551 | | | −3.3554 |
| S13 | Spherical | Infinite | 0.3000 | 1.52 | 64.2 | |
| S14 | Spherical | Infinite | 0.6672 | | | |
| S15 | Spherical | Infinite | | | | |

In example 1, the object-side surface and the image-side surface of each one of the first lens E1 to the sixth lens E6 are both aspheric. The surface shape x of each aspheric lens may be defined by using, but not limited to, the following aspheric formula:

$$x = \frac{ch^2}{1+\sqrt{1-(k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14 and A16 applicable to each aspheric surface S1 to S12 in example 1.

TABLE 2

| Surface number | A4 | A6 | A8 | A10 | A12 | A14 | A16 |
|---|---|---|---|---|---|---|---|
| S1 | −1.0472E−04 | 1.0107E−04 | −7.4123E−06 | 3.1201E−07 | −7.7200E−09 | 1.0269E−10 | −5.4081E−13 |
| S2 | −7.0874E−04 | 1.9971E−04 | −9.5026E−05 | 3.7346E−05 | −6.3893E−06 | 5.4047E−07 | −1.8110E−08 |
| S3 | −2.7098E−04 | −1.3097E−04 | 8.1022E−05 | −2.0638E−05 | 2.6659E−06 | −1.7479E−07 | 4.7186E−09 |
| S4 | 5.4318E−04 | −3.9928E−03 | 4.3489E−03 | −2.5118E−03 | 8.0838E−04 | −1.3635E−04 | 9.4427E−06 |
| S5 | −7.0651E−04 | 1.4024E−05 | 9.5668E−06 | −2.1426E−06 | 3.5468E−07 | −2.3743E−08 | 7.4837E−10 |
| S6 | −3.6424E−03 | 2.3956E−03 | −1.1137E−03 | 2.4540E−04 | −2.9088E−05 | 1.7519E−06 | −4.1024E−08 |
| S7 | 5.3037E−04 | 2.2072E−03 | −1.0653E−03 | 2.2257E−04 | −2.3058E−05 | 1.0846E−06 | −1.5915E−08 |
| S8 | 6.1305E−04 | 1.6649E−04 | −9.7570E−05 | 1.8172E−05 | −1.5544E−06 | 6.4002E−08 | −1.0323E−09 |
| S9 | 7.0622E−05 | −8.4165E−05 | 2.4444E−05 | −3.9474E−06 | 2.7629E−07 | −8.2217E−09 | 8.5032E−11 |
| S10 | 2.0907E−04 | 1.4272E−04 | −1.1430E−05 | 9.1409E−07 | −8.7316E−08 | 3.6418E−09 | −4.7377E−11 |
| S11 | 1.1290E−03 | −7.7960E−05 | 4.4248E−06 | −1.7161E−07 | 3.6662E−09 | −3.8972E−11 | 1.6172E−13 |
| S12 | −8.4370E−04 | 3.3797E−05 | 1.1492E−07 | −4.7107E−08 | 1.3136E−09 | −1.4630E−11 | 5.7631E−14 |

Figure 2A:
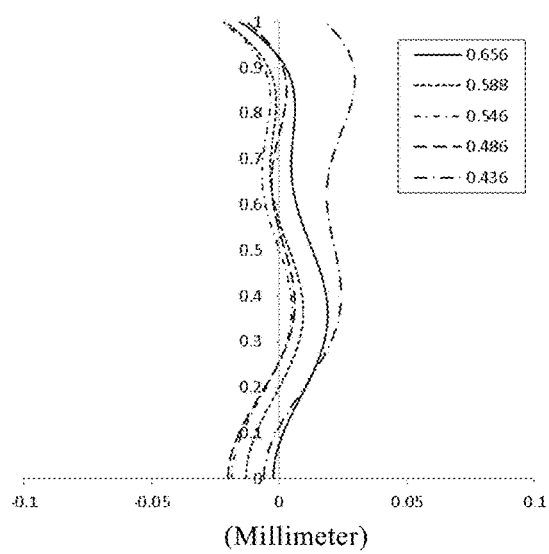
FIGS. 2A to 2D illustrate a longitudinal aberration curve, an astigmatic curve, a distortion curve, and a lateral color curve of the optical imaging lens assembly of Example 1, respectively.
Figure 2B:
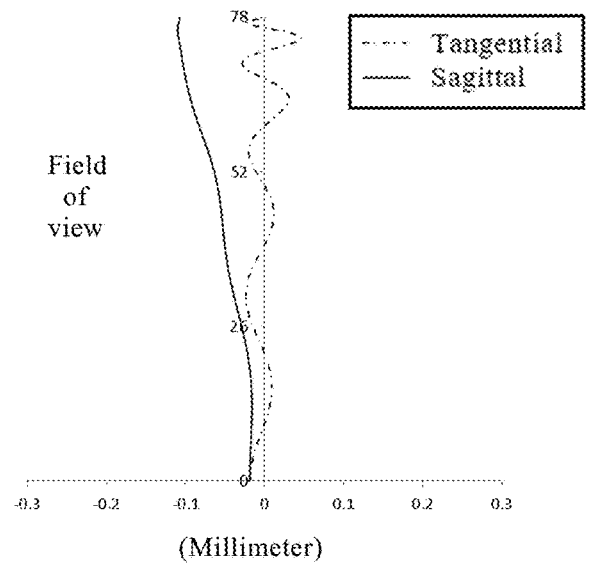
Figure 2C:
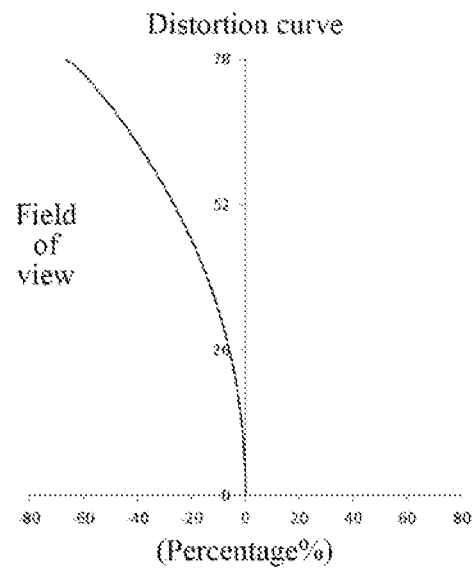
Figure 2D:
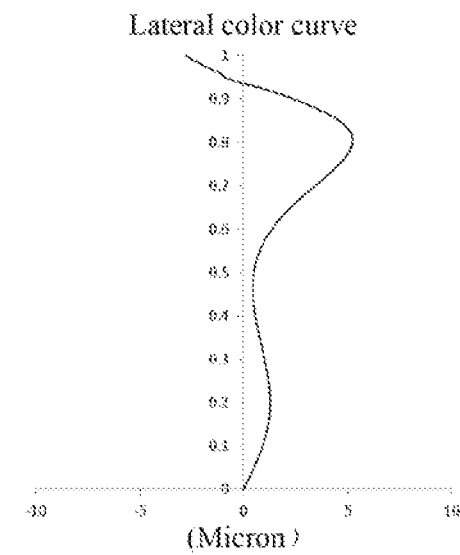

FIG. 2A illustrates a longitudinal aberration curve of the optical imaging lens assembly according to example 1, representing deviations of focal points converged by lights of different wavelengths which pass through the lens assembly. FIG. 2B illustrates an astigmatic curve of the optical imaging lens assembly according to example 1, representing a curvature of a tangential plane and a curvature of a sagittal plane. FIG. 2C illustrates a distortion curve of the optical imaging lens assembly according to example 1, representing amounts of distortion corresponding to different field-of-views. FIG. 2D illustrates a lateral color curve of the optical imaging lens assembly according to example 1, representing deviations of different heights of images on an imaging plane formed by light passing through the lens assembly. It can be seen from FIG. 2A to FIG. 2D that the optical imaging lens assembly provided in example 1 may achieve a good imaging quality.

Example 2

Figure 3:
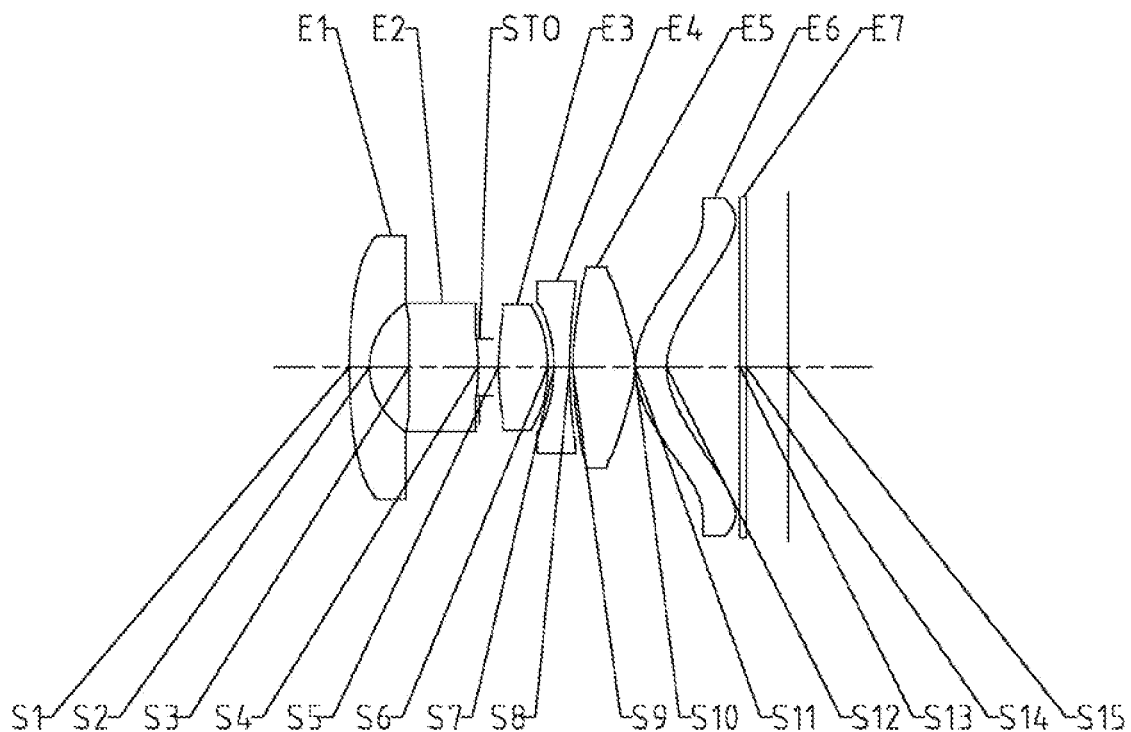
FIG. 3 is a schematic structural diagram showing an optical imaging lens assembly according to Example 2 of the present disclosure.

An optical imaging lens assembly according to Example 2 of the present disclosure is described below with reference to FIGS. 3 to 4D. In this example and the following examples, for brevity, the description of parts similar to those in Example 1 will be omitted. FIG. 3 shows a schematic structural diagram of the optical imaging lens assembly according to Example 2 of the present disclosure.

As shown in FIG. 3, the optical imaging lens assembly includes a first lens E1, a second lens E2, a stop STO, a third lens E3, a fourth lens E4, a fifth lens E5, a sixth lens E6, and an optical filter E7, which are sequentially arranged along an optical axis from an object side to an image side of the optical imaging lens assembly.

The first lens E1 has a negative refractive power, and an object-side surface S1 thereof is a convex surface and an image-side surface S2 thereof is a concave surface. The second lens E2 has a positive refractive power, and an object-side surface S3 thereof is a convex surface and an image-side surface S4 thereof is a convex surface. The third lens E has a positive refractive power, and an object-side surface S5 thereof is a convex surface and an image-side surface S6 thereof is a convex surface. The fourth lens E4 has a negative refractive power, and an object-side surface S7 thereof is a concave surface and an image-side surface S8 thereof is a concave surface. The fifth lens E5 has a positive refractive power, and an object-side surface S9 thereof is a convex surface and an image-side surface S10 thereof is a convex surface. The sixth lens E6 has a positive refractive power, and an object-side surface S11 thereof is a convex surface and an image-side surface S12 thereof is a concave surface. The optical filter E7 has an object-side surface S13 and an image-side surface S14. The optical imaging lens assembly has an imaging plane S15. Light from an object sequentially passes through the respective surfaces S1 to S14 and is finally imaged on the imaging plane S15.

Table 3 shows basic parameters of the optical imaging lens assembly of example 2, where the units for the radius of curvature and the thickness/distance are millimeter (mm). Table 4 shows high-order coefficients applicable to each aspheric surface in example 2, wherein the surface shape of each aspheric surface may be defined by the formula (1) given in the above example 1.

TABLE 3

| | | | | Material | | |
|---|---|---|---|---|---|---|
| Surface number | Surface type | Radius of curvature | Thickness/ Distance | Refractive index | Abbe number | Conic coefficient |
| OBJ | Spherical | Infinite | Infinite | | | |
| S1 | Aspheric | 30.1264 | 0.9433 | 1.55 | 56.1 | 13.0654 |
| S2 | Aspheric | 3.1532 | 1.8158 | | | −0.5441 |
| S3 | Aspheric | 27.1785 | 3.2260 | 1.65 | 23.5 | −97.1332 |
| S4 | Aspheric | −12.2460 | 0.0641 | | | 0.7955 |
| STO | Spherical | Infinite | 0.8677 | | | 0.0000 |
| S5 | Aspheric | 12.3835 | 2.3000 | 1.59 | 61.2 | −2.5677 |
| S6 | Aspheric | −6.3317 | 0.2804 | | | −1.2412 |
| S7 | Aspheric | −6.1403 | 0.7227 | 1.67 | 20.4 | 0.3018 |

TABLE 3-continued

| Surface number | Surface type | Radius of curvature | Thickness/ Distance | Material Refractive index | Abbe number | Conic coefficient |
|---|---|---|---|---|---|---|
| S8 | Aspheric | 17.2935 | 0.1781 | | | −76.3693 |
| S9 | Aspheric | 15.1455 | 2.8579 | 1.55 | 56.1 | −0.2573 |
| S10 | Aspheric | −5.0610 | 0.0300 | | | −2.1960 |
| S11 | Aspheric | 3.6698 | 1.4619 | 1.67 | 20.4 | −2.7998 |
| S12 | Aspheric | 3.2276 | 3.3964 | | | −1.9276 |
| S13 | Spherical | Infinite | 0.3000 | 1.52 | 64.2 | |
| S14 | Spherical | Infinite | 1.9475 | | | |
| S15 | Spherical | Infinite | | | | |

TABLE 4

| Surface number | A4 | A6 | A8 | A10 | A12 | A14 | A16 |
|---|---|---|---|---|---|---|---|
| S1 | 1.3043E−03 | −2.0319E−04 | 1.6799E−05 | −7.7675E−07 | 2.1372E−08 | −3.2863E−10 | 2.2083E−12 |
| S2 | 1.0772E−03 | −2.3059E−04 | −8.7287E−06 | −1.8496E−06 | 1.5730E−06 | −1.7732E−07 | 7.2249E−09 |
| S3 | −3.0965E−03 | −9.3234E−05 | 4.0991E−05 | −1.0548E−05 | 1.7767E−06 | −1.6056E−07 | 5.7286E−09 |
| S4 | −2.3974E−03 | −1.0028E−03 | 6.3539E−04 | 2.8647E−04 | −3.7546E−04 | 1.1954E−04 | −1.2248E−05 |
| S5 | −1.7885E−03 | −1.7149E−04 | −3.0345E−05 | 4.3877E−05 | −7.5032E−06 | 4.8411E−07 | −8.0676E−09 |
| S6 | 4.4861E−03 | −2.7553E−03 | 6.6901E−04 | −1.6190E−04 | 2.8150E−05 | −2.5293E−06 | 8.9028E−08 |
| S7 | 7.4688E−03 | −3.1189E−03 | 8.1975E−04 | −1.3941E−04 | 1.5996E−05 | −1.0846E−06 | 2.9410E−08 |
| S8 | 1.0565E−03 | −8.8825E−04 | 2.0553E−04 | −1.8669E−05 | 7.0155E−07 | −5.4447E−09 | −1.8675E−10 |
| S9 | 1.9753E−03 | −4.8046E−04 | 5.0421E−05 | −3.9908E−06 | 2.0734E−07 | −5.4026E−09 | 5.2415E−11 |
| S10 | 1.1667E−03 | 5.6162E−05 | 5.3173E−05 | −1.0352E−05 | 7.4706E−07 | −2.5623E−08 | 3.5471E−10 |
| S11 | 1.0325E−03 | −7.2632E−05 | 4.3077E−06 | −1.6453E−07 | 3.1293E−09 | −2.9015E−11 | 1.0952E−13 |
| S12 | −1.7149E−03 | 8.0630E−05 | 1.1114E−09 | −1.2880E−07 | 4.1995E−09 | −5.5146E−11 | 2.6704E−13 |

Figure 4A:
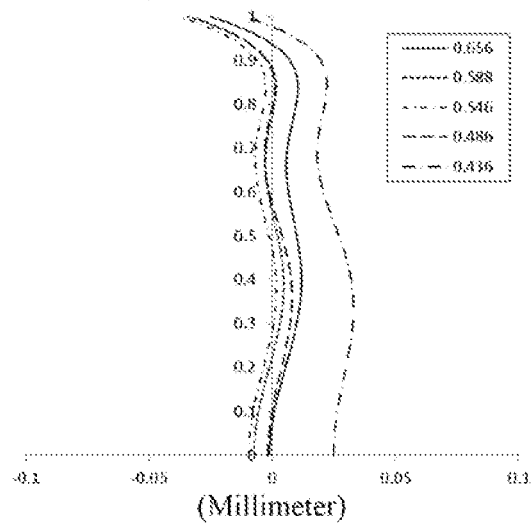
FIGS. 4A to 4D illustrate a longitudinal aberration curve, an astigmatic curve, a distortion curve, and a lateral color curve of the optical imaging lens assembly of Example 2, respectively.
Figure 4B:
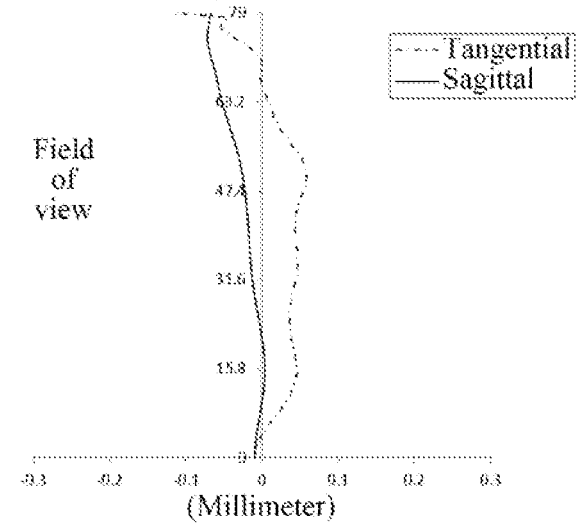
Figure 4C:
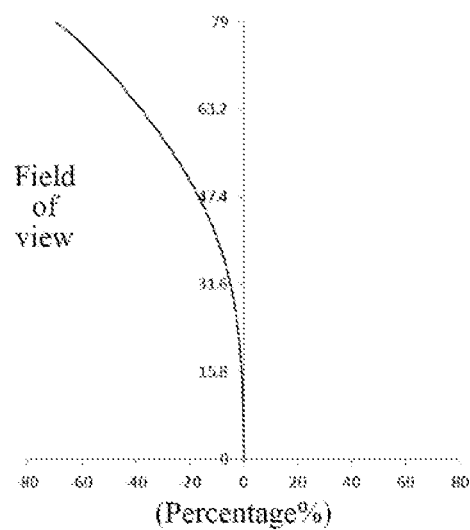
Figure 4D:
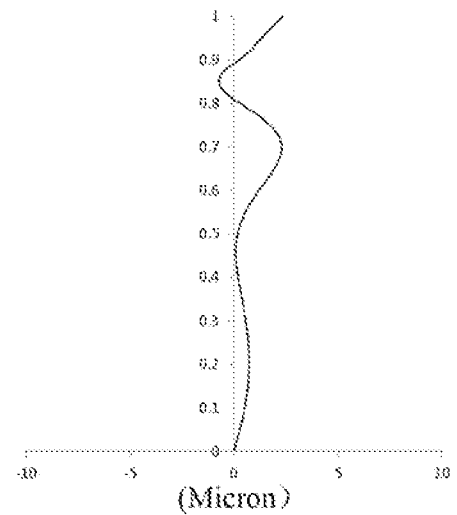

FIG. 4A illustrates a longitudinal aberration curve of the optical imaging lens assembly according to example 2, representing deviations of focal points converged by lights of different wavelengths which pass through the lens assembly. FIG. 4B illustrates an astigmatic curve of the optical imaging lens assembly according to example 2, representing a curvature of a tangential plane and a curvature of a sagittal plane. FIG. 4C illustrates a distortion curve of the optical imaging lens assembly according to example 2, representing amounts of distortion corresponding to different field-of-views. FIG. 4D illustrates a lateral color curve of the optical imaging lens assembly according to example 2, representing deviations of different heights of images on an imaging plane formed by light passing through the lens assembly. It can be seen from FIG. 4A to FIG. 4D that the optical imaging lens assembly provided in example 2 may achieve a good imaging quality.

Example 3

Figure 5:
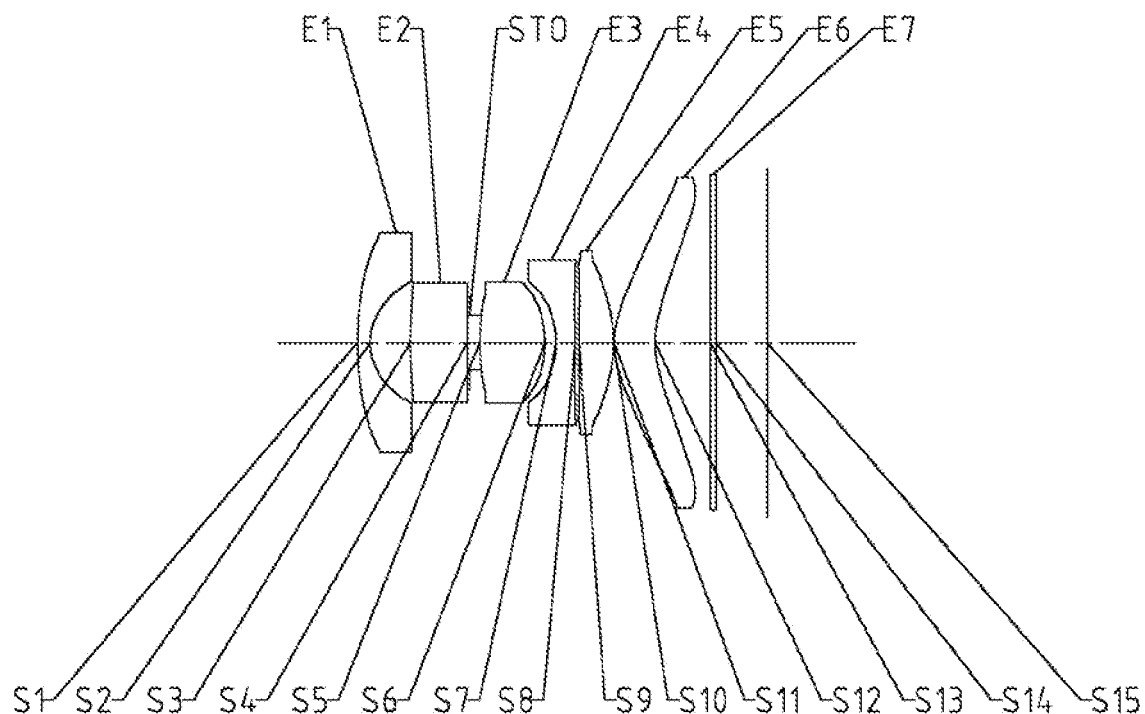
FIG. 5 is a schematic structural diagram showing an optical imaging lens assembly according to Example 3 of the present disclosure.

An optical imaging lens assembly according to Example 3 of the present disclosure is described below with reference to FIGS. 5 to 6D. FIG. 5 shows a schematic structural diagram of the optical imaging lens assembly according to Example 3 of the present disclosure.

As shown in FIG. 5, the optical imaging lens assembly includes a first lens E1, a second lens E2, a stop STO, a third lens E3, a fourth lens E4, a fifth lens E5, a sixth lens E6, and an optical filter E7, which are sequentially arranged along an optical axis from an object side to an image side of the optical imaging lens assembly.

The first lens E1 has a negative refractive power, and an object-side surface S1 thereof is a convex surface and an image-side surface S2 thereof is a concave surface. The second lens E2 has a positive refractive power, and an object-side surface S3 thereof is a convex surface and an image-side surface S4 thereof is a concave surface. The third lens E3 has a positive refractive power, and an object-side surface S5 thereof is a convex surface and an image-side surface S6 thereof is a convex surface. The fourth lens E4 has a negative refractive power, and an object-side surface S7 thereof is a concave surface and an image-side surface S8 thereof is a convex surface. The fifth lens E5 has a positive refractive power, and an object-side surface S9 thereof is a convex surface and an image-side surface S10 thereof is a convex surface. The sixth lens E6 has a positive refractive power, and an object-side surface S11 thereof is a convex surface and an image-side surface S12 thereof is a concave surface. The optical filter E7 has an object-side surface S13 and an image-side surface S14. The optical imaging lens assembly has an imaging plane S15. Light from an object sequentially passes through the respective surfaces S1 to S14 and is finally imaged on the imaging plane S15.

Table 5 shows basic parameters of the optical imaging lens assembly of example 3, where the units for the radius of curvature and the thickness/distance are millimeter (mm). Table 6 shows high-order coefficients applicable to each aspheric surface in example 3, where the surface shape of each aspheric surface may be defined by the formula (1) given in the above example 1.

TABLE 5

| Surface number | Surface type | Radius of curvature | Thickness/ Distance | Material Refractive index | Abbe number | Conic coefficient |
|---|---|---|---|---|---|---|
| OBJ | Spherical | Infinite | Infinite | | | |
| S1 | Aspheric | 12.6875 | 0.5874 | 1.55 | 56.1 | −41.6383 |
| S2 | Aspheric | 2.6355 | 1.8300 | | | −0.3999 |
| S3 | Aspheric | 11.8165 | 2.6218 | 1.65 | 23.5 | −6.3552 |
| S4 | Aspheric | 104.5693 | 0.1160 | | | −99.0000 |
| STO | Spherical | Infinite | 0.4441 | | | |
| S5 | Aspheric | 9.5557 | 3.0000 | 1.59 | 61.2 | 4.4227 |
| S6 | Aspheric | −4.8183 | 0.5103 | | | −0.5098 |
| S7 | Aspheric | −3.5547 | 0.8664 | 1.67 | 20.4 | 0.4136 |
| S8 | Aspheric | −28.1944 | 0.2006 | | | 41.7976 |
| S9 | Aspheric | 659.8724 | 1.5847 | 1.55 | 56.1 | 99.0000 |
| S10 | Aspheric | −6.7267 | 0.0300 | | | −0.7256 |
| S11 | Aspheric | 4.1992 | 1.8778 | 1.67 | 20.4 | −4.0008 |
| S12 | Aspheric | 5.1408 | 2.5093 | | | −5.9053 |
| S13 | Spherical | Infinite | 0.3000 | 1.52 | 64.2 | |
| S14 | Spherical | Infinite | 2.3338 | | | |
| S15 | Spherical | Infinite | | | | |

TABLE 6

| Surface number | A4 | A6 | A8 | A10 | A12 | A14 | A16 |
|---|---|---|---|---|---|---|---|
| S1 | −2.1785E−04 | 2.1610E−04 | −2.1709E−05 | 1.3265E−06 | −4.9802E−08 | 1.0275E−09 | −8.8263E−12 |
| S2 | −3.3777E−03 | 2.4182E−04 | −8.5363E−05 | 6.0523E−05 | −1.5696E−05 | 1.9317E−06 | −9.0982E−08 |
| S3 | −2.7291E−03 | −2.8773E−04 | 1.4248E−04 | −3.3576E−05 | 4.5477E−06 | −3.4363E−07 | 1.1244E−08 |
| S4 | −1.2805E−03 | −4.6920E−03 | 5.5673E−03 | −3.1066E−03 | 8.8282E−04 | −1.1247E−04 | 4.4704E−06 |
| S5 | −1.8705E−03 | −1.7327E−04 | 1.4307E−04 | −5.4965E−05 | 1.3553E−05 | −1.4477E−06 | 5.6234E−08 |
| S6 | 8.6288E−04 | −1.3045E−04 | −3.9375E−04 | 8.3700E−05 | −4.4609E−06 | −4.7960E−07 | 5.2744E−08 |
| S7 | 1.4980E−02 | −9.2162E−04 | −6.7137E−04 | 1.3011E−04 | 1.1708E−06 | −2.1066E−06 | 1.4948E−07 |
| S8 | 1.5828E−03 | 2.0829E−03 | −7.3292E−04 | 1.1154E−04 | −8.9409E−06 | 3.7058E−07 | −6.2677E−09 |
| S9 | −2.2891E−03 | 1.4882E−03 | −2.6488E−04 | 1.8343E−05 | −5.0873E−07 | 5.7602E−09 | −8.4963E−11 |
| S10 | 1.8204E−03 | −2.3061E−04 | 3.4006E−05 | 6.6104E−08 | −5.3018E−07 | 4.2306E−08 | −9.4497E−10 |
| S11 | 6.3576E−05 | −1.5652E−06 | −2.0641E−06 | 1.3728E−07 | −3.5182E−09 | 4.0311E−11 | −1.7196E−13 |
| S12 | 2.6354E−04 | −3.9578E−05 | 1.2479E−06 | −1.3295E−08 | 8.8720E−11 | −3.3879E−12 | 3.6766E−14 |

Figure 6A:
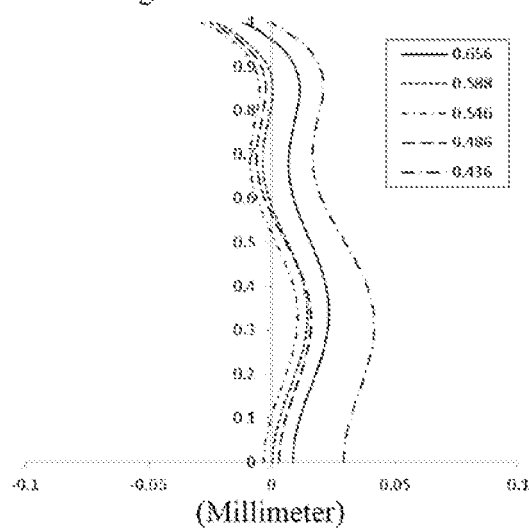
FIGS. 6A to 6D illustrate a longitudinal aberration curve, an astigmatic curve, a distortion curve, and a lateral color curve of the optical imaging lens assembly of Example 3, respectively.
Figure 6B:
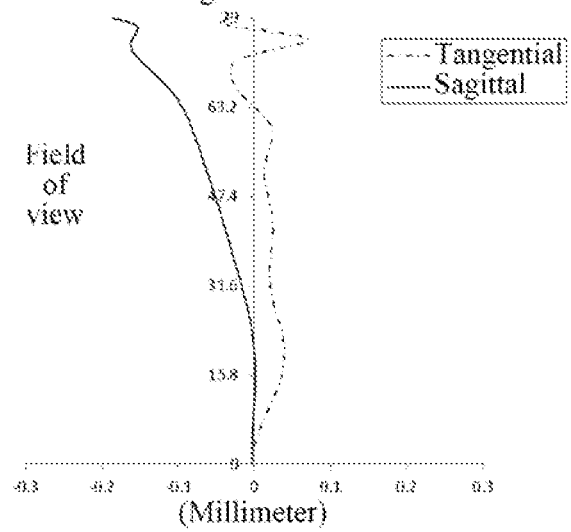
Figure 6C:
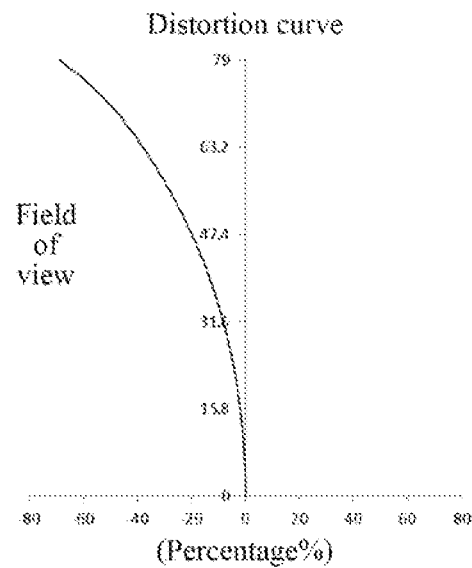
Figure 6D:
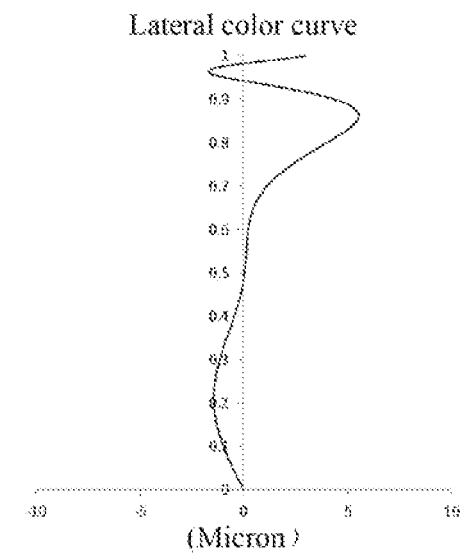

FIG. 6A illustrates a longitudinal aberration curve of the optical imaging lens assembly according to example 3, representing deviations of focal points converged by lights of different wavelengths which pass through the lens assembly. FIG. 6B illustrates an astigmatic curve of the optical imaging lens assembly according to example 3, representing a curvature of a tangential plane and a curvature of a sagittal plane. FIG. 6C illustrates a distortion curve of the optical imaging lens assembly according to example 3, representing amounts of distortion corresponding to different field-of-views. FIG. 6D illustrates a lateral color curve of the optical imaging lens assembly according to example 3, representing deviations of different heights of images on an imaging plane formed by light passing through the lens assembly. It can be seen from FIG. 6A to FIG. 6D that the optical imaging lens assembly provided in example 3 may achieve a good imaging quality.

Example 4

Figure 7:
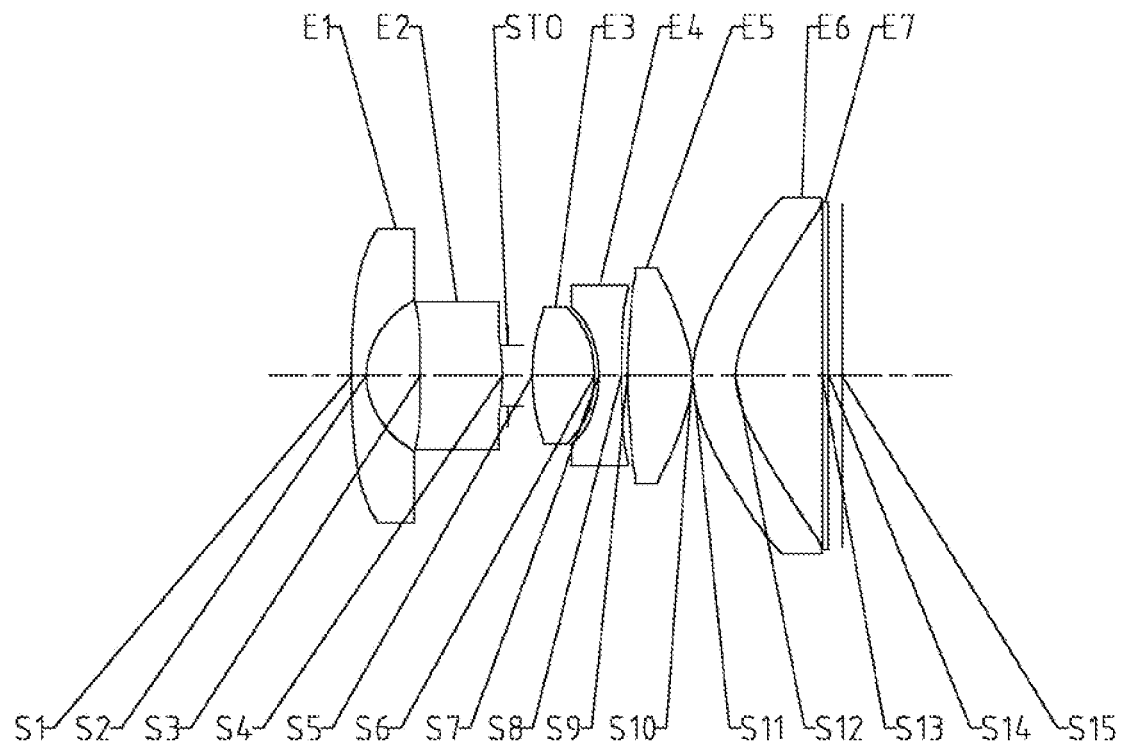
FIG. 7 is a schematic structural diagram showing an optical imaging lens assembly according to Example 4 of the present disclosure.

An optical imaging lens assembly according to Example 4 of the present disclosure is described below with reference to FIGS. 7 to 8D. FIG. 7 shows a schematic structural diagram of the optical imaging lens assembly according to Example 4 of the present disclosure.

As shown in FIG. 7, the optical imaging lens assembly includes a first lens E1, a second lens E2, a stop STO, a third lens E3, a fourth lens E4, a fifth lens E5, a sixth lens E6, and an optical filter E7, which are sequentially arranged along an optical axis from an object side to an image side of the optical imaging lens assembly.

The first lens E1 has a negative refractive power, and an object-side surface S1 thereof is a convex surface and an image-side surface S2 thereof is a concave surface. The second lens E2 has a positive refractive power, and an object-side surface S3 thereof is a convex surface and an image-side surface S4 thereof is a convex surface. The third lens E3 has a positive refractive power, and an object-side surface S5 thereof is a convex surface and an image-side surface S6 thereof is a convex surface. The fourth lens E4 has a negative refractive power, and an object-side surface S7 thereof is a concave surface and an image-side surface S8 thereof is a concave surface. The fifth lens E5 has a positive refractive power, and an object-side surface S9 thereof is a convex surface and an image-side surface S10 thereof is a convex surface. The sixth lens E6 has a negative refractive power, and an object-side surface S11 thereof is a convex surface and an image-side surface S12 thereof is a concave surface. The optical filter E7 has an object-side surface S13 and an image-side surface S14. The optical imaging lens assembly has an imaging plane S15. Light from an object sequentially passes through the respective surfaces S1 to S14 and is finally imaged on the imaging plane S15.

Table 7 shows basic parameters of the optical imaging lens assembly of example 4, where the units for the radius of curvature and the thickness/distance are millimeter (mm). Table 8 shows high-order coefficients applicable to each aspheric surface in example 4, wherein the surface shape of each aspheric surface may be defined by the formula (1) given in the above example 1.

TABLE 7

| Surface number | Surface type | Radius of curvature | Thickness/ Distance | Material Refractive index | Material Abbe number | Conic coefficient |
|---|---|---|---|---|---|---|
| OBJ | Spherical | Infinite | Infinite | | | |
| S1 | Aspheric | 49.4324 | 0.7000 | 1.55 | 56.1 | −30.0089 |
| S2 | Aspheric | 3.4379 | 2.5215 | | | −0.4649 |
| S3 | Aspheric | 75.8100 | 3.8677 | 1.65 | 23.5 | −71.8265 |
| S4 | Aspheric | −10.0934 | 0.2219 | | | −1.8733 |
| STO | Spherical | Infinite | 1.1702 | | | 0.0000 |
| S5 | Aspheric | 10.4016 | 2.9438 | 1.59 | 61.2 | 5.2874 |
| S6 | Aspheric | −5.2648 | 0.2033 | | | −0.5841 |
| S7 | Aspheric | −5.3296 | 1.0473 | 1.67 | 20.4 | 1.2249 |
| S8 | Aspheric | 63.4602 | 0.2869 | | | 18.7934 |
| S9 | Aspheric | 22.8215 | 3.0272 | 1.55 | 56.1 | −23.1074 |
| S10 | Aspheric | −5.5123 | 0.0300 | | | −2.3819 |
| S11 | Aspheric | 5.2627 | 2.0140 | 1.67 | 20.4 | −6.9208 |
| S12 | Aspheric | 3.7143 | 4.0513 | | | −2.6579 |
| S13 | Spherical | Infinite | 0.3000 | 1.52 | 64.2 | |
| S14 | Spherical | Infinite | 0.6300 | | | |
| S15 | Spherical | Infinite | | | | |

TABLE 8

| Surface number | A4 | A6 | A8 | A10 | A12 | A14 | A16 |
|---|---|---|---|---|---|---|---|
| S1 | 1.4329E−04 | 1.1906E−05 | −4.2280E−07 | 1.1495E−08 | −2.2494E−10 | 2.2985E−12 | −3.8280E−15 |
| S2 | −7.8291E−04 | 3.2112E−05 | −2.3233E−05 | 8.2141E−06 | −1.2236E−06 | 9.3613E−08 | −2.8036E−09 |
| S3 | −2.3585E−03 | −8.5954E−05 | 4.0052E−05 | −7.0395E−06 | 6.5143E−07 | −3.1658E−08 | 6.5815E−10 |

TABLE 8-continued

| Surface number | A4 | A6 | A8 | A10 | A12 | A14 | A16 |
|---|---|---|---|---|---|---|---|
| S4 | 4.6933E−04 | −2.7958E−03 | 2.6123E−03 | −1.2886E−03 | 3.5232E−04 | −5.0278E−05 | 2.9333E−06 |
| S5 | −4.4217E−04 | 9.7481E−06 | −2.7677E−05 | 1.1748E−05 | −1.9364E−06 | 1.5760E−07 | −4.9367E−09 |
| S6 | −3.2167E−03 | 1.3496E−03 | −4.7286E−04 | 6.4269E−05 | −3.1572E−06 | −6.3429E−08 | 8.1203E−09 |
| S7 | 7.7117E−04 | 8.0372E−04 | −2.5405E−04 | 1.9961E−05 | 2.1704E−06 | −4.2402E−07 | 1.8053E−08 |
| S8 | 1.2531E−03 | −2.5063E−04 | 1.7732E−04 | 1.9212E−05 | −3.1791E−07 | 1.5240E−08 | −2.5114E−10 |
| S9 | 7.1483E−04 | −2.6161E−04 | 2.9514E−05 | −1.9346E−06 | 7.5115E−08 | −1.4431E−09 | 9.8868E−12 |
| S10 | −3.6147E−04 | 2.8110E−04 | −2.7223E−05 | 1.3147E−06 | −4.1363E−08 | 7.5262E−10 | −4.1451E−12 |
| S11 | 1.6142E−03 | −6.6619E−05 | 1.8911E−06 | −4.1700E−08 | 6.2756E−10 | −5.1690E−12 | 1.7111E−14 |
| S12 | −1.3523E−03 | 1.1543E−04 | −5.3812E−06 | 1.5407E−07 | −2.7172E−09 | 2.7018E−11 | −1.1491E−13 |

Figure 8A:
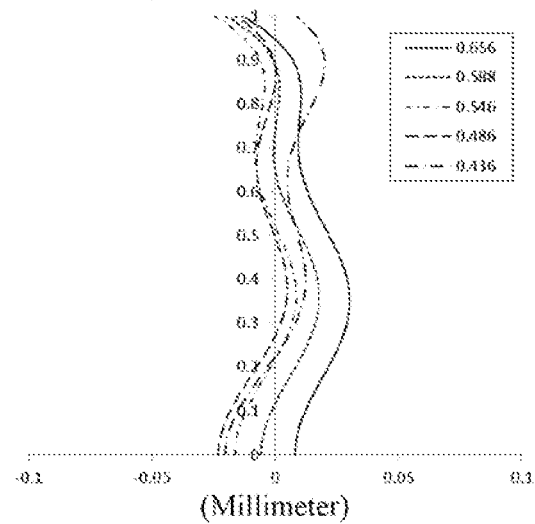
FIGS. 8A to 8D illustrate a longitudinal aberration curve, an astigmatic curve, a distortion curve, and a lateral color curve of the optical imaging lens assembly of Example 4, respectively.
Figure 8B:
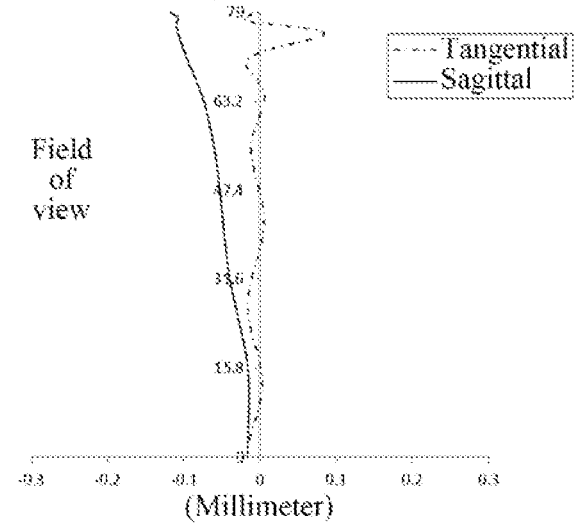
Figure 8C:
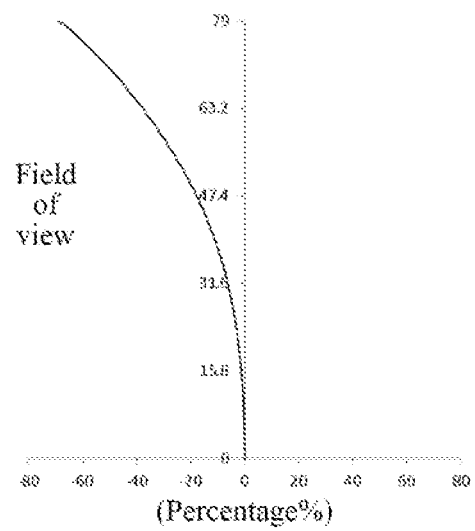
Figure 8D:
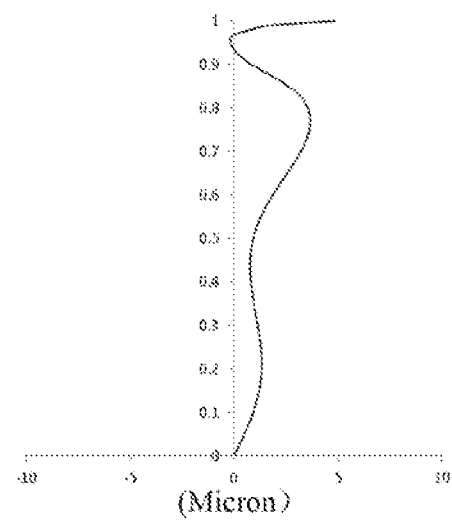

FIG. 8A illustrates a longitudinal aberration curve of the optical imaging lens assembly according to example 4, representing deviations of focal points converged by lights of different wavelengths which pass through the lens assembly. FIG. 8B illustrates an astigmatic curve of the optical imaging lens assembly according to example 4, representing a curvature of a tangential plane and a curvature of a sagittal plane. FIG. 8C illustrates a distortion curve of the optical imaging lens assembly according to example 4, representing amounts of distortion corresponding to different field-of-views. FIG. 8D illustrates a lateral color curve of the optical imaging lens assembly according to example 4, representing deviations of different heights of images on an imaging plane formed by light passing through the lens assembly. It can be seen from FIG. 8A to FIG. 8D that the optical imaging lens assembly provided in example 4 may achieve a good imaging quality.

Example 5

Figure 9:
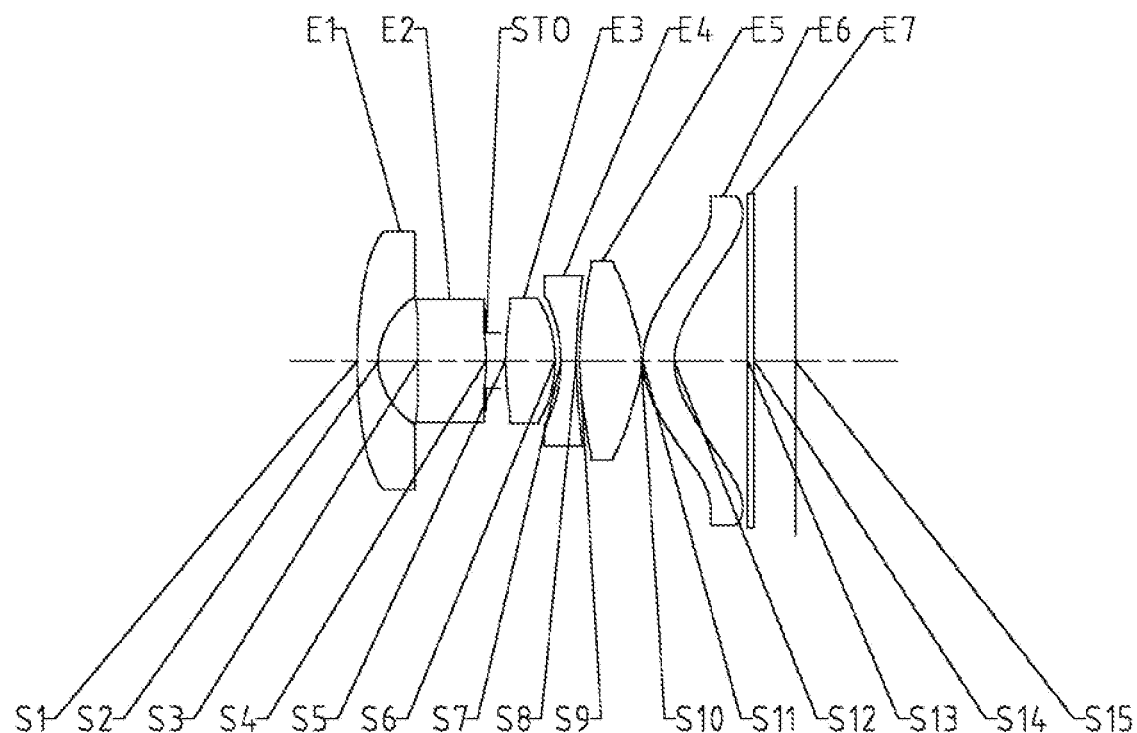
FIG. 9 is a schematic structural diagram showing an optical imaging lens assembly according to Example 5 of the present disclosure.

An optical imaging lens assembly according to Example 5 of the present disclosure is described below with reference to FIGS. 9 to 10D. FIG. 9 shows a schematic structural diagram of the optical imaging lens assembly according to Example 5 of the present disclosure.

As shown in FIG. 9, the optical imaging lens assembly includes a first lens E1, a second lens E2, a stop STO, a third lens E3, a fourth lens E4, a fifth lens E5, a sixth lens E6, and an optical filter E7, which are sequentially arranged along an optical axis from an object side to an image side of the optical imaging lens assembly.

The first lens E1 has a negative refractive power, and an object-side surface S1 thereof is a convex surface and an image-side surface S2 thereof is a concave surface. The second lens E2 has a positive refractive power, and an object-side surface S3 thereof is a convex surface and an image-side surface S4 thereof is a convex surface. The third lens E3 has a positive refractive power, and an object-side surface S5 thereof is a convex surface and an image-side surface S6 thereof is a convex surface. The fourth lens E4 has a negative refractive power, and an object-side surface S7 thereof is a concave surface and an image-side surface S8 thereof is a concave surface. The fifth lens E5 has a positive refractive power, and an object-side surface S9 thereof is a convex surface and an image-side surface S10 thereof is a convex surface. The sixth lens E6 has a positive refractive power, and an object-side surface S11 thereof is a convex surface and an image-side surface S12 thereof is a concave surface. The optical filter E7 has an object-side surface S13 and an image-side surface S14. The optical imaging lens assembly has an imaging plane S15. Light from an object sequentially passes through the respective surfaces S1 to S14 and is finally imaged on the imaging plane S15.

Table 9 shows basic parameters of the optical imaging lens assembly of example 5, where the units for the radius of curvature and the thickness/distance are millimeter (mm). Table 10 shows high-order coefficients applicable to each aspheric surface in example 5, wherein the surface shape of each aspheric surface may be defined by the formula (1) given in the above example 1.

TABLE 9

| Surface number | Surface type | Radius of curvature | Thickness/ Distance | Material Refractive index | Material Abbe number | Conic coefficient |
|---|---|---|---|---|---|---|
| OBJ | Spherical | Infinite | Infinite | | | |
| S1 | Aspheric | 27.9997 | 0.9700 | 1.55 | 56.1 | 9.3753 |
| S2 | Aspheric | 3.1376 | 1.8084 | | | −0.5082 |
| S3 | Aspheric | 28.4379 | 3.1633 | 1.65 | 23.5 | −99.0000 |
| S4 | Aspheric | −12.4541 | −0.0015 | | | 1.7106 |
| STO | Spherical | Infinite | 0.8906 | | | 0.0000 |
| S5 | Aspheric | 12.0063 | 2.3000 | 1.59 | 61.2 | −2.7312 |
| S6 | Aspheric | −6.3711 | 0.2815 | | | −0.9674 |
| S7 | Aspheric | −6.0465 | 0.7030 | 1.67 | 20.4 | 0.2361 |
| S8 | Aspheric | 17.8025 | 0.1657 | | | −74.1820 |
| S9 | Aspheric | 14.6169 | 2.8593 | 1.55 | 56.1 | −2.5157 |
| S10 | Aspheric | −5.0155 | 0.0657 | | | −2.1798 |
| S11 | Aspheric | 3.6698 | 1.4505 | 1.67 | 20.4 | −2.7998 |
| S12 | Aspheric | 3.2276 | 3.3968 | | | −1.9276 |
| S13 | Spherical | Infinite | 0.3000 | 1.52 | 64.2 | |
| S14 | Spherical | Infinite | 1.9037 | | | |
| S15 | Spherical | Infinite | | | | |

TABLE 10

| Surface number | A4 | A6 | A8 | A10 | A12 | A14 | A16 |
|---|---|---|---|---|---|---|---|
| S1 | 1.3243E−03 | −2.0919E−04 | 1.7589E−05 | −8.2839E−07 | 2.3186E−08 | −3.6172E−10 | 2.4568E−12 |
| S2 | 1.0958E−03 | −2.2076E−04 | −2.0016E−05 | 1.0563E−06 | 1.3336E−06 | −1.7899E−07 | 7.9560E−09 |
| S3 | −3.0785E−03 | −1.3614E−04 | 6.4995E−05 | −1.7459E−05 | 2.8482E−06 | −2.4542E−07 | 8.4045E−09 |
| S4 | −2.4521E−03 | −8.7718E−04 | 3.4765E−04 | 5.9794E−04 | −5.4835E−04 | 1.6709E−04 | −1.7409E−05 |
| S5 | −1.7878E−03 | −1.8957E−04 | −1.8532E−05 | 4.0435E−05 | −6.9797E−06 | 4.4572E−07 | −7.0721E−09 |
| S6 | 4.5247E−03 | −2.8019E−03 | 6.9104E−04 | −1.6757E−04 | 2.8981E−05 | −2.5939E−06 | 9.1099E−08 |

TABLE 10-continued

| Surface number | A4 | A6 | A8 | A10 | A12 | A14 | A16 |
|---|---|---|---|---|---|---|---|
| S7 | 7.4741E−03 | −3.1225E−03 | 8.2176E−04 | −1.4003E−04 | 1.6097E−05 | −1.0927E−06 | 2.9641E−08 |
| S8 | 1.0618E−03 | −8.8859E−04 | 2.0529E−04 | −1.8608E−05 | 6.9572E−07 | −5.1838E−09 | −1.9143E−10 |
| S9 | 1.9730E−03 | −4.7985E−04 | 5.0412E−05 | −3.9954E−06 | 2.0776E−07 | −5.4184E−09 | 5.2645E−11 |
| S10 | 1.1926E−03 | 4.2420E−05 | 5.5940E−05 | −1.0631E−05 | 7.6251E−07 | −2.6075E−08 | 3.6018E−10 |
| S11 | 1.0325E−03 | −7.2632E−05 | 4.3077E−06 | −1.6453E−07 | 3.1293E−09 | −2.9015E−11 | 1.0952E−13 |
| S12 | −1.7149E−03 | 8.9630E−05 | 1.1114E−09 | −1.2880E−07 | 4.1995E−09 | −5.5146E−11 | 2.6704E−13 |

Figures 10A, 10B:
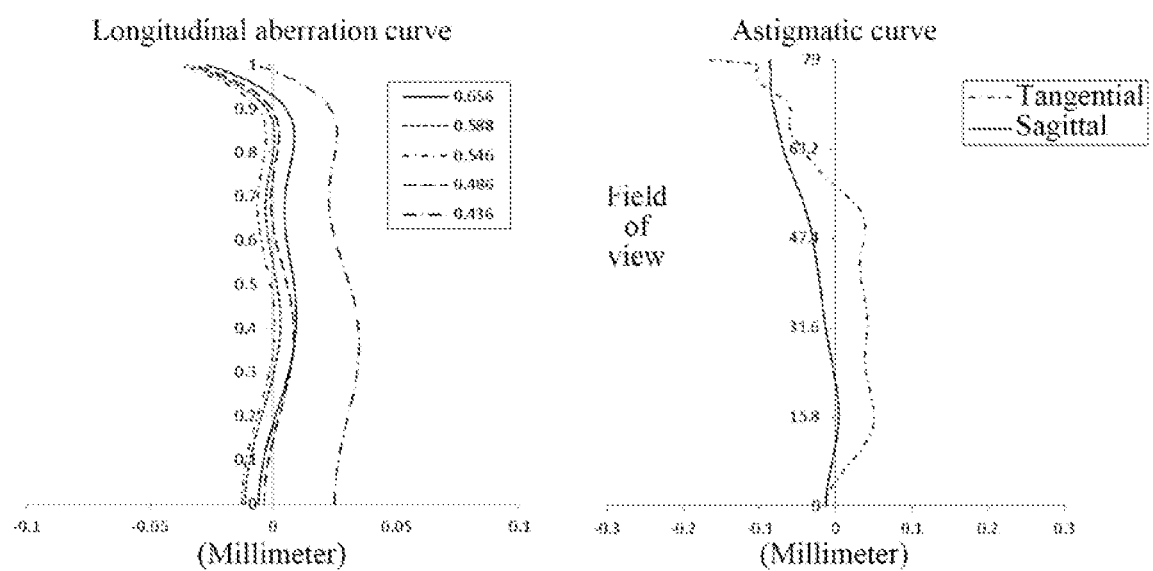
FIGS. 10A to 10D illustrate a longitudinal aberration curve, an astigmatic curve, a distortion curve, and a lateral color curve of the optical imaging lens assembly of Example 5, respectively.
Figure 10C:
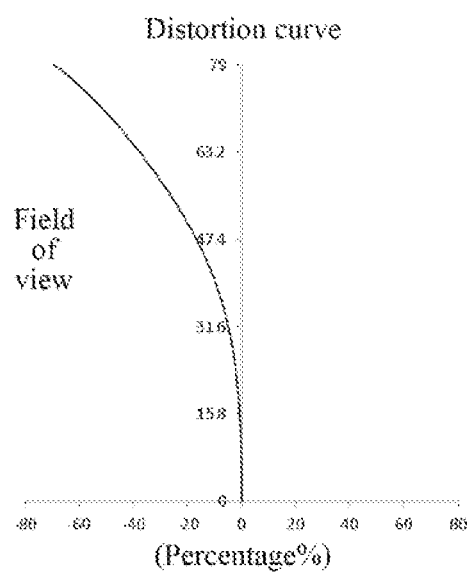
Figure 10D:
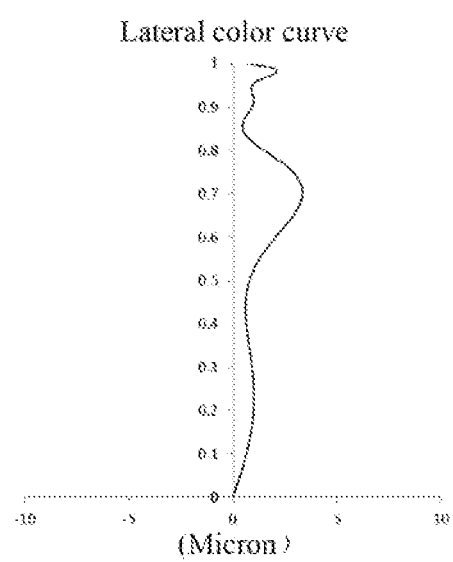

FIG. 10A illustrates a longitudinal aberration curve of the optical imaging lens assembly according to example 5, representing deviations of focal points converged by lights of different wavelengths which pass through the lens assembly. FIG. 10B illustrates an astigmatic curve of the optical imaging lens assembly according to example 5, representing a curvature of a tangential plane and a curvature of a sagittal plane. FIG. 10C illustrates a distortion curve of the optical imaging lens assembly according to example 5, representing amounts of distortion corresponding to different field-of-views. FIG. 10D illustrates a lateral color curve of the optical imaging lens assembly according to example 5, representing deviations of different heights of images on an imaging plane formed by light passing through the lens assembly. It can be seen from FIG. 10A to FIG. 10D that the optical imaging lens assembly provided in example 5 may achieve a good imaging quality.

In examples 1 to 5, the effective focal length f of the optical imaging lens assembly, the focal lengths f1 to f16 of the lenses, the axial distance TTL from the object-side surface of the first lens to the imaging plane, the half of the diagonal length ImgH of the effective pixel area on the imaging plane, the half of the maximal field-of-view Semi-FOV, the aperture number Fno of the optical imaging lens assembly, the distance EIN from the object-side surface of the first lens to the image-side surface of the sixth lens at the half of the entrance pupil diameter in the direction parallel to the optical axis, the distance ETL from the object-side surface of the first lens to the imaging plane at the half of the entrance pupil diameter in the direction parallel to the optical axis, the axial distance SD from the stop to the image-side surface of the sixth lens, the thickness ETP1 of the first lens at the half of the entrance pupil diameter in the direction parallel to the optical axis and the thickness ETP2 of the second lens at the half of the entrance pupil diameter in the direction parallel to the optical axis, the combined focal length f12 of the first lens and the second lens, and the combined focal length f23 of the second lens and the third lens are shown in Table 11.

TABLE 11

| Parameter | Example 1 | Example 2 | Example 3 | Example 4 | Example 5 |
|---|---|---|---|---|---|
| f (mm) | 5.00 | 5.10 | 5.01 | 5.00 | 5.09 |
| f1 (mm) | −6.79 | −6.52 | −5.75 | −6.80 | −6.56 |
| f2 (mm) | 14.12 | 13.50 | 20.39 | 14.03 | 13.82 |
| f3 (mm) | 6.24 | 7.42 | 4.71 | 6.85 | 7.38 |
| f4 (mm) | −7.28 | −6.69 | −6.17 | −7.31 | −6.67 |
| f5 (mm) | 8.41 | 7.31 | 12.19 | 8.44 | 7.20 |
| f6 (mm) | −41.17 | 291.29 | 24.61 | −42.75 | 307.92 |
| TTL (mm) | 20.42 | 20.39 | 18.81 | 23.01 | 20.26 |
| ImgH (mm) | 7.99 | 8.08 | 8.03 | 8.05 | 8.08 |
| Semi-FOV (°) | 78.0 | 79.0 | 79.0 | 79.0 | 79.0 |
| Fno | 3.00 | 3.00 | 3.00 | 3.00 | 3.00 |
| EIN (mm) | 15.78 | 14.84 | 13.71 | 18.12 | 16.42 |
| ETL (mm) | 20.41 | 20.38 | 18.79 | 23.01 | 21.91 |
| SD (mm) | 9.54 | 8.70 | 8.51 | 10.72 | 8.72 |
| ETP1 (mm) | 0.69 | 1.05 | 0.69 | 0.79 | 1.07 |
| ETP2 (mm) | 3.05 | 3.18 | 2.60 | 3.83 | 3.12 |
| f12 (mm) | −26.92 | −22.97 | −8.94 | −36.16 | −21.78 |
| f23 (mm) | 5.01 | 5.46 | 4.46 | 5.38 | 5.45 |

Examples 1 to 5 respectively satisfy the relationship shown in Table 12.

TABLE 12

| Conditional | Example 1 | Example 2 | Example 3 | Example 4 | Example 5 |
|---|---|---|---|---|---|
| f5/f3 | 1.35 | 0.98 | 2.59 | 1.23 | 0.98 |
| f4/f | −1.45 | −1.31 | −1.23 | −1.46 | −1.31 |
| f2/f1 | −2.08 | −2.07 | −3.55 | −2.06 | −2.11 |
| R3/R5 | 4.12 | 2.19 | 1.24 | 7.29 | 2.37 |
| (R6 + R7)/R10 | 2.04 | 2.46 | 1.24 | 1.92 | 2.48 |
| (R11 + R12)/f | 1.65 | 1.35 | 1.87 | 1.79 | 1.35 |
| R1/R2 | 12.25 | 9.55 | 4.81 | 14.38 | 8.92 |
| BFL/T12 | 2.07 | 3.11 | 2.81 | 1.98 | 3.10 |
| TTL/(CT2 + CT3) | 3.70 | 3.69 | 3.35 | 3.38 | 3.71 |
| SD/ImgH | 1.19 | 1.08 | 1.06 | 1.33 | 1.08 |
| ETL/EIN | 1.29 | 1.37 | 1.37 | 1.27 | 1.33 |
| TTL/BFL | 4.32 | 3.61 | 3.66 | 4.62 | 3.62 |
| ETP2/ETP1 | 4.42 | 3.04 | 3.74 | 4.82 | 2.91 |
| f12/f23 | −5.38 | −4.21 | −2.00 | −6.72 | −4.00 |

The present disclosure further provides an imaging apparatus, in which an electronic photosensitive element is arranged for imaging. The electronic photosensitive element may be a photosensitive charge-coupled device (CCD) or a complementary metal-oxide semiconductor (CMOS) element. The imaging apparatus may be an independent imaging device such as a digital camera, or may be an imaging module integrated in a mobile electronic device such as a mobile phone. The imaging apparatus is equipped with the optical imaging lens assembly described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly, sequentially from an object side to an image side along an optical axis, comprising:
   a first lens having a refractive power, an object-side surface of the first lens being convex;
   a second lens having a refractive power, an object-side surface of the second lens being convex;
   a third lens having a positive refractive power;
   a fourth lens having a negative refractive power, an object-side surface of the fourth lens being concave;
   a fifth lens having a refractive power; and
   a sixth lens having a refractive power;
   wherein a half of a maximal field-of-view Semi-FOV of the optical imaging lens assembly satisfies: Semi-FOV≥70°,
   wherein a half of a diagonal length ImgH of an effective pixel area on an imaging plane of the optical imaging lens assembly satisfies: ImgH≥7.8 mm, and
   wherein a radius of curvature R11 of an object-side surface of the sixth lens, a radius of curvature R12 of an image-side surface of the sixth lens and an effective focal length f of the optical imaging lens assembly satisfy: 1.0<(R11+R12)/f<2.0.

2. The optical imaging lens assembly according to claim 1, wherein an effective focal length f3 of the third lens and an effective focal length f5 of the fifth lens satisfy: 0.5<f5/f3<2.6.

3. The optical imaging lens assembly according to claim 1, wherein an effective focal length f4 of the fourth lens and the effective focal length f of the optical imaging lens assembly satisfy: −1.5<f4/f<−1.0.

4. The optical imaging lens assembly according to claim 1, wherein an effective focal length f1 of the first lens and an effective focal length f2 of the second lens satisfy: −4.0<f2/f1<−2.0.

5. The optical imaging lens assembly according to claim 1, wherein a radius of curvature R3 of the object-side surface of the second lens and a radius of curvature R5 of an object-side surface of the third lens satisfy: R3/R5>1.0.

6. The optical imaging lens assembly according to claim 1, wherein a radius of curvature R6 of an image-side surface of the third lens, a radius of curvature R7 of the object-side surface of the fourth lens and a radius of curvature R10 of an image-side surface of the fifth lens satisfy: 1.0<(R6+R7)/R10<2.5.

7. The optical imaging lens assembly according to claim 1, wherein a radius of curvature R1 of the object-side surface of the first lens and a radius of curvature R2 of an image-side surface of the first lens satisfy: 4.5<R1/R2<14.5.

8. The optical imaging lens assembly according to claim 1, wherein an axial distance BFL from the image-side surface of the sixth lens to the imaging plane and a spaced interval T12 between the first lens and the second lens along the optical axis satisfy: 1.5<BFL/T12<3.5.

9. The optical imaging lens assembly according to claim 1, wherein an axial distance TTL from the object-side surface of the first lens to the imaging plane, an axial center thickness CT2 of the second lens and an axial center thickness CT3 of the third lens satisfy: 3.0<TTL/(CT2+CT3)<4.0.

10. The optical imaging lens assembly according to claim 1, wherein a thickness ETP1 of the first lens at a half of an entrance pupil diameter in a direction parallel to the optical axis and a thickness ETP2 of the second lens at the half of the entrance pupil diameter in the direction parallel to the optical axis satisfy: 2.5<ETP2/ETP1<5.0.

11. The optical imaging lens assembly according to claim 1, wherein a combined focal length f12 of the first lens and the second lens and a combined focal length f23 of the second lens and the third lens satisfy: −7.0<f12/f23≤−2.0.

12. The optical imaging lens assembly according to claim 1, wherein at least one of the first lens to the sixth lens is an aspheric glass lens.

13. The optical imaging lens assembly according to claim 1, wherein a distance EIN from the object-side surface of the first lens to the image-side surface of the sixth lens at the half of an entrance pupil diameter in a direction parallel to the optical axis and a distance ETL from the object-side surface of the first lens to the imaging plane at the half of the entrance pupil diameter in the direction parallel to the optical axis satisfy: 1.0<ETL/EIN<1.5.

14. The optical imaging lens assembly according to claim 1, wherein the optical imaging lens assembly further comprises a stop, and an axial distance SD from the stop to the image-side surface of the sixth lens and the half of the diagonal length ImgH of the effective pixel area on the imaging plane satisfy: 1.0<SD/ImgH<1.5.

15. The optical imaging lens assembly according to claim 1, wherein an axial distance TTL from the object-side surface of the first lens to the imaging plane and an axial distance BFL from the image-side surface of the sixth lens to the imaging plane satisfy: 3.5<TTL/BFL<5.0.

16. An optical imaging lens assembly, sequentially from an object side to an image side along an optical axis, comprising:
   a first lens having a negative refractive power, an object-side surface of the first lens being convex;
   a second lens having a positive refractive power, an object-side surface of the second lens being convex;
   a third lens having a positive refractive power;
   a fourth lens having a negative refractive power, an object-side surface of the fourth lens being concave;
   a fifth lens having a positive refractive power; and
   a sixth lens having a refractive power;
   wherein a half of a maximal field-of-view Semi-FOV of the optical imaging lens assembly satisfies: Semi-FOV≥70°,
   wherein a half of a diagonal length ImgH of an effective pixel area on an imaging plane of the optical imaging lens assembly satisfies: ImgH≥7.8 mm, and
   wherein a radius of curvature R11 of an object-side surface of the sixth lens, a radius of curvature R12 of an image-side surface of the sixth lens and an effective focal length f of the optical imaging lens assembly satisfy: 1.0<(R11+R12)/f<2.0.

17. The optical imaging lens assembly according to claim 16, wherein an effective focal length f3 of the third lens and an effective focal length f5 of the fifth lens satisfy: 0.5<f5/f3<2.6.

18. The optical imaging lens assembly according to claim 16, wherein an effective focal length f4 of the fourth lens and the effective focal length f of the optical imaging lens assembly satisfy: −1.5<f4/f<−1.0.

19. The optical imaging lens assembly according to claim 16, wherein an effective focal length f1 of the first lens and an effective focal length f2 of the second lens satisfy: −4.0<f2/f1<−2.0.

\* \* \* \* \*